(12) United States Patent
Nakayama et al.

(10) Patent No.: US 10,807,252 B2
(45) Date of Patent: Oct. 20, 2020

(54) ROTATION AXIS MODULE AND ARTICULATED ROBOT

(71) Applicant: FANUC CORPORATION, Yamanashi (JP)

(72) Inventors: Kazutaka Nakayama, Yamanashi (JP); Masahiro Morioka, Yamanashi (JP); Kenichiro Abe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 530 days.

(21) Appl. No.: 15/453,556

(22) Filed: Mar. 8, 2017

(65) Prior Publication Data

US 2017/0259436 A1 Sep. 14, 2017

(30) Foreign Application Priority Data

Mar. 9, 2016 (JP) .................................. 2016-045653

(51) Int. Cl.
| | |
|---|---|
| *B25J 19/00* | (2006.01) |
| *B25J 9/06* | (2006.01) |
| *B25J 9/08* | (2006.01) |
| *B25J 13/00* | (2006.01) |

(52) U.S. Cl.
CPC ............ *B25J 19/0029* (2013.01); *B25J 9/06* (2013.01); *B25J 9/08* (2013.01); *B25J 13/006* (2013.01); *B25J 19/0045* (2013.01)

(58) Field of Classification Search
CPC ........... B25J 9/0025; B25J 9/0029; B25J 9/08
See application file for complete search history.

(56) References Cited

U.S. PATENT DOCUMENTS

| | | | | |
|---|---|---|---|---|
| 4,542,858 | A * | 9/1985 | Manges | B25J 19/0029 174/86 |
| 4,798,341 | A * | 1/1989 | Gimple | B05B 5/03 118/629 |
| 4,862,759 | A * | 9/1989 | Trevelyan | B25J 9/103 74/417 |
| 4,904,148 | A * | 2/1990 | Larsson | B25J 9/04 414/680 |

(Continued)

FOREIGN PATENT DOCUMENTS

| | | |
|---|---|---|
| CN | 101269490 A | 9/2008 |
| CN | 102218742 A | 10/2011 |

(Continued)

*Primary Examiner* — Howard J Sanders
*Assistant Examiner* — Gregory T Prather
(74) *Attorney, Agent, or Firm* — Hauptman Ham, LLP

(57) ABSTRACT

A rotation axis module includes: an actuator which relatively rotates a fixed member and a movable member; a umbilical member which penetrates through the interior of the actuator to extend; a first fixing portion which fixes the umbilical member at a rotation axis of the fixed member or at a position corresponding to the vicinity thereof; a second fixing portion which fixes the umbilical member at an output axis of the movable member or in the vicinity thereof; a first relay portion which is positioned at a side of the fixed member, one end of the umbilical member being connected to the first relay portion; and a second relay portion which is positioned at a side of the movable member, the other end of the umbilical member being connected to the second relay portion.

22 Claims, 14 Drawing Sheets

(56) References Cited

U.S. PATENT DOCUMENTS

| | | | | |
|---|---|---|---|---|
| 4,932,831 A * | 6/1990 | White | | B25J 5/005 180/2.1 |
| 5,136,196 A | 8/1992 | Schmidt | | |
| 5,212,432 A * | 5/1993 | Ohtani | | B25J 9/046 310/56 |
| 5,375,480 A * | 12/1994 | Nihei | | B25J 19/0029 74/490.02 |
| 5,498,163 A * | 3/1996 | Takamura | | B25J 19/0029 439/13 |
| 5,549,016 A * | 8/1996 | Nakako | | B25J 17/0258 74/490.02 |
| 7,905,472 B2 * | 3/2011 | Nakano | | H02G 11/00 269/289 R |
| 2003/0062858 A1 | 4/2003 | Shimizu et al. | | |
| 2003/0085681 A1 | 5/2003 | Sakamoto et al. | | |
| 2003/0200831 A1 * | 10/2003 | Matsumoto | | B25J 19/0029 74/490.06 |
| 2004/0149064 A1 * | 8/2004 | Narita | | B25J 9/06 74/490.03 |
| 2004/0261563 A1 * | 12/2004 | Inoue | | B25J 19/0025 74/490.03 |
| 2005/0072261 A1 * | 4/2005 | Okada | | B25J 19/0029 74/490.01 |
| 2005/0103148 A1 * | 5/2005 | Inoue | | B25J 19/0029 74/490.02 |
| 2006/0101936 A1 * | 5/2006 | Inoue | | B25J 19/0029 74/490.01 |
| 2007/0031232 A1 * | 2/2007 | Kurebayashi | | B25J 19/0029 414/682 |
| 2007/0142971 A1 * | 6/2007 | Schena | | B25J 19/0029 700/251 |
| 2008/0056859 A1 * | 3/2008 | Inoue | | B25J 19/0029 414/222.01 |
| 2008/0229861 A1 * | 9/2008 | Inoue | | B25J 19/0029 74/490.01 |
| 2008/0236324 A1 * | 10/2008 | Inoue | | B25J 9/046 74/490.02 |
| 2008/0260510 A1 * | 10/2008 | Iwai | | B25J 19/0029 414/787 |
| 2008/0315820 A1 * | 12/2008 | Inoue | | B25J 19/0029 318/568.11 |
| 2009/0032649 A1 * | 2/2009 | Inoue | | B25J 17/0283 248/49 |
| 2009/0114052 A1 * | 5/2009 | Haniya | | B25J 9/0087 74/490.03 |
| 2010/0009825 A1 * | 1/2010 | Norton | | B25J 15/04 483/58 |
| 2010/0180710 A1 * | 7/2010 | Lee | | B25J 19/0029 74/490.05 |
| 2011/0222999 A1 | 9/2011 | Kubota et al. | | |
| 2012/0277080 A1 * | 11/2012 | Strotzer | | B25J 15/04 483/1 |
| 2013/0168505 A1 * | 7/2013 | Ljungkvist | | B25J 9/0009 248/56 |
| 2014/0020498 A1 * | 1/2014 | Adachi | | B25J 19/0029 74/490.02 |
| 2014/0083229 A1 * | 3/2014 | Kume | | B25J 19/0025 74/490.02 |
| 2014/0137685 A1 * | 5/2014 | Iwayama | | B25J 18/00 74/490.02 |
| 2015/0096401 A1 | 4/2015 | Nagai et al. | | |
| 2015/0321361 A1 * | 11/2015 | Hahakura | | B25J 18/00 74/490.01 |
| 2017/0291313 A1 * | 10/2017 | Inoue | | B25J 19/0029 |
| 2017/0307836 A1 * | 10/2017 | Iwasaki | | B25J 19/0029 |
| 2017/0368697 A1 * | 12/2017 | Inoue | | B25J 9/102 |
| 2018/0147734 A1 * | 5/2018 | Nakayama | | B25J 17/00 |
| 2018/0195915 A1 * | 7/2018 | Nakayama | | B25J 13/085 |
| 2018/0219447 A1 * | 8/2018 | Kim | | H02K 7/116 |
| 2018/0333844 A1 * | 11/2018 | Inoue | | B25J 9/08 |

FOREIGN PATENT DOCUMENTS

| | | |
|---|---|---|
| CN | 102765095 A | 11/2012 |
| CN | 103358321 A | 10/2013 |
| CN | 103722564 A | 4/2014 |
| JP | 6161776 A | 3/1986 |
| JP | 3256690 A | 11/1991 |
| JP | 557664 A | 3/1993 |
| JP | 200138671 A | 2/2001 |
| JP | 2003103490 A | 4/2003 |
| JP | 2003117877 A | 4/2003 |
| JP | 2005-237168 A | 9/2005 |
| JP | 2011189437 A | 9/2011 |
| JP | 5540981 B2 | 7/2014 |
| JP | 5560260 B2 | 7/2014 |
| JP | 2015-54357 A | 3/2015 |
| WO | 2014112349 A1 | 7/2014 |

* cited by examiner

VIEW DIRECTION OF ARROW A

ROTATION AXIS MODULE AND ARTICULATED ROBOT

RELATED APPLICATIONS

The present application claims priority to Japanese Patent Application Number 2016-045653 filed Mar. 9, 2016, the disclosure of which is hereby incorporated by reference herein in its entirety.

BACKGROUND OF THE INVENTION

1. Field of the Invention

The present invention relates to a rotation axis module and a robot including at least one such rotation axis module.

2. Description of the Related Art

An industrial robot, particularly an articulated robot includes at least one joint portion to which two links are connected to each other. At the joint portion, an actuator which drives the links is provided, and at least a power wire and a signal wire for driving the actuator are necessary. Further, a signal wire, an air pipe, a high speed communication signal wire, and the like for driving an end effector provided at a tip end of the industrial robot are necessary. In the present specification, such a power wire, an air pipe, and various types of signal wires will be collectively referred to as "umbilical member".

The wire element is desirably housed inside the links of the robot. In robots of Japanese Unexamined Patent Publication No. 2015-54357 and Japanese Patent No. 5540981, the umbilical member is housed in a space between an outer cylinder of a power transmission axis and a speed reducer output axis, and the like. Further, it is disclosed that in a robot of Japanese Patent No. 5560260, the umbilical member penetrates through the interior of a hollow actuator of the joint portion.

SUMMARY OF THE INVENTION

A space between an outer circumference of the outer cylinder the power transmission axis and an inner surface of a cover of the speed reducer, and the like as disclosed in Japanese Unexamined Patent Publication No. 2015-54357 and Japanese Patent No. 5540981 are comparatively small and not sufficient to house the umbilical member, and the umbilical member comes into contact with an outer circumferential surface of the outer cylinder of the power transmission axis, the inner surface of the cover of the speed reducer, and the like, and stresses are likely to be applied to the umbilical member so that assuring the lifetime of the umbilical member for a long period is difficult.

Further, Japanese Patent No. 5560260 discloses an embodiment in which the umbilical member is fixed by a fixed member disposed on a separate member adjacent to the actuator, and fails to disclose fixing the same by a fixed member disposed on the actuator. Consequently, in rearrangement of the actuator, it is necessary to break a positional relationship between the umbilical member and the actuator, and in reassemblage, it is necessary to take care whether the umbilical member intersects with each other so that rearrangement becomes no longer easy.

The present invention has been made in view of such circumstances and has an object to provide a rotation axis module in which assemblage and rearrangement of a robot is easy while a high reliability and a long lifetime of a umbilical member are assured, and a robot including such a rotation axis module.

To achieve the above object, according to a first aspect of the invention, provided is a rotation axis module including: an actuator which relatively rotates a fixed member to which a first link is to be mounted and a movable member to which a second link is to be mounted; a umbilical member which penetrates through the interior of the actuator to extend; a first fixing portion which fixes the umbilical member to the fixed member; a second fixing portion which fixes the umbilical member to the movable member; a first relay portion which is positioned at a side of the fixed member, one end of the umbilical member being connected to the first relay portion; and a second relay portion which is positioned at a side of the movable member, the other end of the umbilical member being connected to the second relay portion.

According to a second aspect of the invention, in the first aspect of the invention, in the interior of the actuator, the umbilical member transmits electricity in a space of a boundary portion between the movable member and the fixed member in a wireless manner using a wireless transmission unit which transmits electricity.

According to a third aspect of the invention, in the first aspect of the invention, in the interior of the actuator, the umbilical member is provided with a rotary joint which transmits electricity and air.

According to a fourth aspect of the invention, in the first aspect of the invention, the first fixing portion is provided at a rotation axis of the fixed member or in the vicinity thereof, while the second fixing portion is provided at a rotation axis of the movable member or in the vicinity thereof.

According to a fifth aspect of the invention, in the second aspect of the invention, the wireless transmission unit has a hollow structure, and an air supply tube which extends along a rotation axis of the movable member passes through the wireless transmission unit.

According to a sixth aspect of the invention, in the second aspect of the invention, an air supply tube which extends along a rotation axis of the movable member is disposed outside the wireless transmission unit.

According to a seventh aspect of the invention, in any one of the first to sixth aspects of the invention, the actuator is a combination of a speed reducer and a drive motor.

According to an eighth aspect of the invention, in any one of the first to sixth aspects of the invention, the actuator is a direct drive motor.

According to a ninth aspect of the invention, in the seventh aspect of the invention, the speed reducer includes a plurality of parallel axes or intersecting axes, a plurality of gears which are mounted to the plurality of parallel axes or intersecting axes, and a plurality of ball bearings which support the plurality of parallel axes or intersecting axes.

According to a tenth aspect of the invention, in any one of the first to ninth aspects of the invention, a change mechanism portion which changes a link length or an offset amount of at least one of the first link and the second link is included.

According to an eleventh aspect of the invention, in any one of the first to tenth aspects of the invention, the actuator includes a first attachment portion which is arranged perpendicular relative to an output axis of the movable member and is to be mounted to one from between the first link and the second link, and a second attachment portion which is arranged parallel relative to the output axis of the movable member and is to be mounted to the other from between the first link and the second link, and the first attachment portion and the second attachment portion have a mounting interface common to a second link mounting surface of the movable member.

According to a twelfth aspect of the invention, in any one of the first to eleventh aspects of the invention, the first link and the second link include a relay umbilical member, a third relay portion to which one end of the relay umbilical member is connected, and a fourth relay portion to which the other end of the relay umbilical member is connected, the third relay portion of the first link is configured to be connected to the first relay portion, and the fourth relay portion of the second link is configured to be connected to the second relay portion.

According to a thirteenth aspect of the invention, in the twelfth aspect of the invention, from at least one of the relay umbilical member, the third relay portion, and the fourth relay portion, at least one branch umbilical member is branched, and an arrangement change portion which changes arrangement of the relay umbilical member and the at least one branch umbilical member is included.

According to a fourteenth aspect of the invention, in any one of the first to thirteenth aspects of the invention, further, a definition mechanism portion which defines a correlation between an origin point of an output axis of the movable member and a reference of the fixed member while the first link and the second link fail to be attached to the fixed member and the movable member, respectively, is included.

According to a fifteenth aspect of the invention, in any one of the first to fourteenth aspects of the invention, further, a definition mechanism portion which defines a correlation between an origin point of an output axis of the movable member and a reference of the fixed member while the first link and the second link are attached to the fixed member and the movable member, respectively, is included.

According to a sixteenth aspect of the invention, in any one of the first to fifteenth aspects of the invention, further, an attachment member to which a cover for covering the rotation axis module is attached is included.

According to a seventeenth aspect of the invention, in any one of the first to sixteenth aspects of the invention, a seal portion which seals the actuator is included.

According to an eighteenth aspect of the invention, in any one of the first to seventeenth aspects of the invention, the umbilical member is configured to be attached to and detached from the rotation axis module.

According to a nineteenth aspect of the invention, in any one of the first to eighteenth aspects of the invention, configuration is made such that another umbilical member which penetrates through the interior of the actuator is added.

According to a twentieth aspect of the invention, in any one of the first to nineteenth aspects of the invention, at least one of a twist amount measurement device and a torque measurement device, and a force sensor is mounted to or incorporated into the movable member of the rotation axis module.

According to a twenty-first aspect of the invention, a robot including at least one rotation axis module according to any one of the first to twentieth aspects is provided.

Such objects, features, and advantages of the present invention and other objects, features, and advantages will become further clearer from the detailed description of typical embodiments of the present invention which are illustrated in the attached drawings.

DETAILED DESCRIPTION

Hereinafter, the attached figures will be referred to so as to describe embodiments of the present invention. In the following figures, similar members are assigned similar reference signs. To facilitate understanding, these figures are suitably changed in scale.

Figure 1:
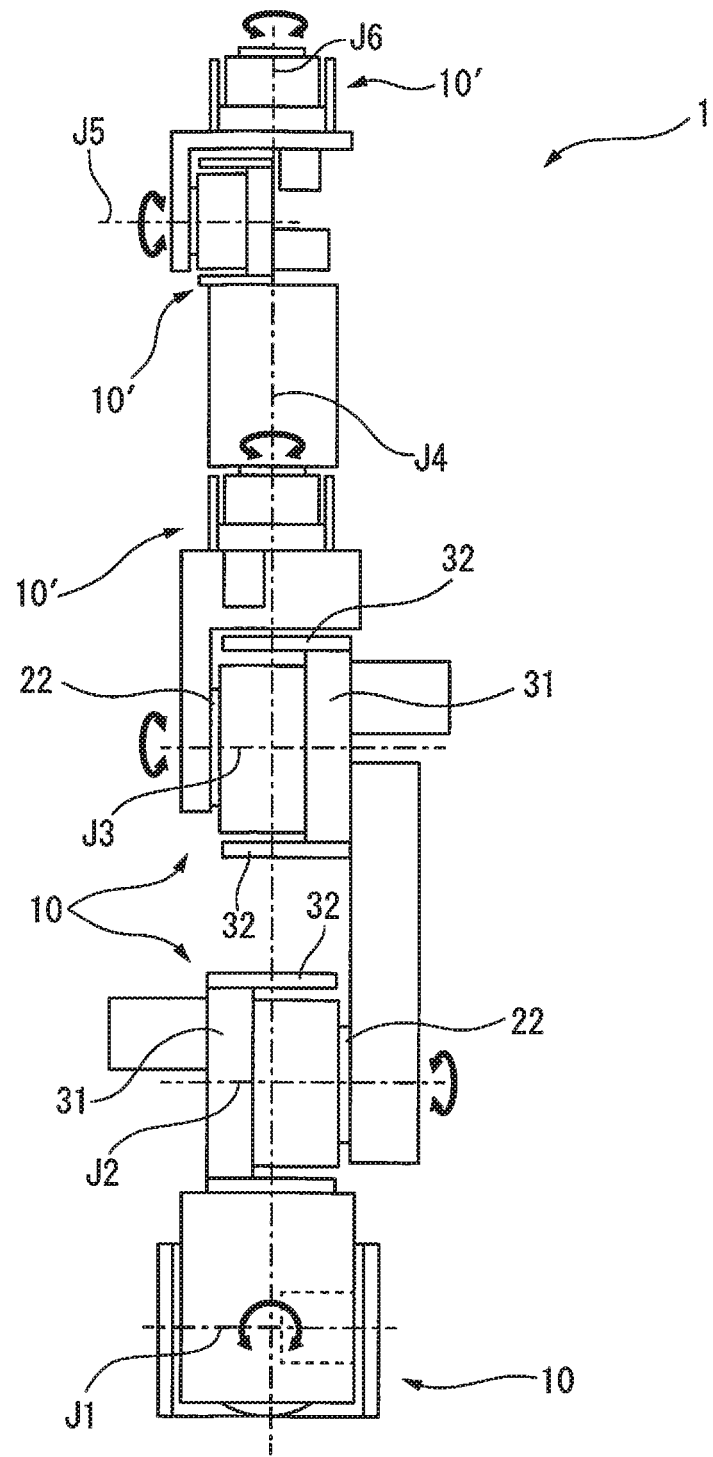
FIG. 1 is a top view of a robot including a rotation axis module of the present invention.

FIG. 1 is a top view of a robot including a rotation axis module of the present invention. A robot 1 as illustrated in FIG. 1 is a six-axis vertical articulated robot, and includes six joint axes J1-J6. Each joint axis is driven by a rotation axis module 10 or a rotation axis module 10' as described below.

An arm of the robot 1 is made of a plurality of arm portions, and the rotation axis modules 10, 10' are disposed between the two adjacent arm portions. The robot 1 as illustrated in FIG. 1 includes the three rotation axis modules 10 and the three rotation axis modules 10' smaller than the rotation axis module 10.

All axes of the robot may be made of the same rotation axis module, but since generally the nearer the axis is relative to a terminal end, the lighter a weight of an arm is at a terminal end side relative to such axis, it is unnecessary to use the same rotation axis module 10 for the entirety of the robot 1. In the present invention, at a base end side of the robot 1, three of the rotation axis modules 10 are disposed, and at the terminal end side of the robot 1, three of the rotation axis modules 10' are disposed. In other words, it is configured that at the terminal end side of the robot 1, the small rotation axis module 10' is used. In comparison to a case in which the same rotation axis module is used at all the axes, a total weight of the arm and costs can be reduced. Further, when a mounting interface of the rotation axis module is common to all the axes, since the nearer the axis is relative to the terminal end side of the robot 1, the lighter the weight of the arm is at the terminal end side relative to such axis, and a load applied to a movable member reduces, the number of bolts necessary to fix the rotation axis modules 10, 10' may be reduced.

In FIG. 1, the rotation axis modules 10, 10' are controlled in such a manner that the arm of the robot 1 entirely extends linearly. Because the rotation axis modules 10, 10' have a substantially similar configuration except for the size, hereinafter, only the rotation axis module 10 will be described.

Figure 2:
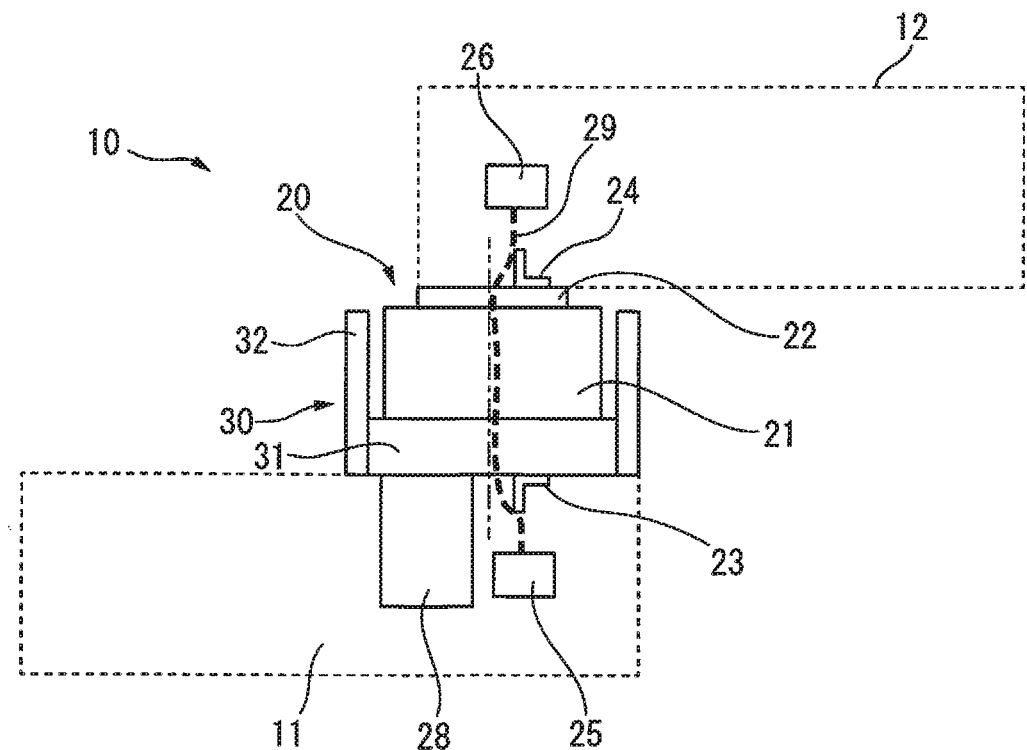
FIG. 2 is a first enlarged view of the rotation axis module.

FIG. 2 is a first enlarged view of the rotation axis module. The rotation axis module 10 mainly includes an actuator 20 and a case 30 to which the actuator is provided. Further, the actuator 20 includes a fixed member 21 which is fixed to the case 30 and a movable member 22 which rotates relative to the fixed member 21.

As illustrated, the fixed member 21 is mounted through the case 30 to a first link 11. Similarly, the movable member 22 is mounted directly to a second link 12. The first link 11 and the second link 12 correspond to any two of the arm portions of the robot 1 as illustrated in FIG. 1 which are adjacent to each other. The fixed member 21 of the actuator 20 operates integrally with the first link 11, and the movable member 22 of the actuator 20 rotates integrally with the second link 12. Note that the fixed member 21 may be mounted directly to the first link 11. In such a case, an interface as described below is configured to be provided on a bottom surface of the fixed member 21.

The actuator 20 may be configured by, for example, a combination of a speed reducer and a drive motor, or the actuator 20 may be configured only by a direct drive motor. Note that in FIG. 2, a drive motor 28 which drives the actuator 20 as a speed reducer is mounted to the case 30. Note that using a direct drive motor allows the links 11, 12 to be directly driven without using a speed reducer so that a position determination accuracy of the robot 1 can be improved.

As illustrated in FIG. 2, a umbilical member 29 which extends along an output axis of the movable member 22 penetrates through the interior of the actuator 20. The umbilical member 29 favorably penetrates through a hollow portion in the actuator 20. Alternatively, the umbilical member 29 having a waterproof structure or an oil-proof structure may pass through a lubricant passage of the actuator 20. The umbilical member 29 is configured to include at least one of a power wire and a signal wire for the actuator 20, a power wire, a signal wire, and an air pipe for controlling a tool (unillustrated) provided at the tip end of the robot 1. Note that when the actuator 20 is configured by the combination of a speed reducer and a drive motor, the drive motor is disposed offset from a movable member rotation axis, and an embodiment in which the speed reducer has a hollow structure and the drive motor fails to have a hollow structure, and an embodiment in which the speed reducer and the drive motor have a hollow structure are possible. When the actuator 20 is configured only by a direct drive motor, the direct drive motor itself desirably has a hollow structure.

As illustrated, one end of the umbilical member 29 is connected to a first relay portion 25 which is positioned at a fixed member 21 side. Then, between the first relay portion 25 and the actuator 20, the umbilical member 29 is fixed to the case 30 by a first fixing portion 23. Similarly, the other end of the umbilical member 29 is connected to a second relay portion 26 which is positioned at a movable member 22 side. Then, between the second relay portion 26 and the actuator 20, the umbilical member 29 is fixed to the movable member 22 by a second fixing portion 24.

As apparent from FIG. 2, the first fixing portion 23 and the second fixing portion 24 may be positioned away from the center of the actuator 20. Further, the first fixing portion 23 and the second fixing portion 24 are a member having a substantial L shape in the present embodiment, which may be another shape.

The first relay portion 25 and the second relay portion 26 of the actuator 20 are, for example, a connector, and are connected to another relay portion as described below. Further, as apparent from FIG. 2, when the first link 11 and the second link 12 are linked to the rotation axis module 10, the first relay portion 25 and the second relay portion 26 may be housed in the interior of the first link 11 and the second link 12, respectively, and may be assembled with the case 30 and the movable member 22, respectively.

Thus, in the present invention, the umbilical member 29 of the rotation axis module 10 is fixed to the fixed member 21 and the movable member 22 by the first fixing portion 23 and the second fixing portion 24, respectively. Consequently, in the present invention, the umbilical member 29 performs a twisting movement only between the first fixing portion 23 and the second fixing portion 24, whereby rotation in an axial direction is absorbed. Thus, the rotation axis module 10 having a high reliability, while a twisting movement of the umbilical member 29 is finished, can be provided.

Further, both end portions of the umbilical member 29 are connected to the relay portions 25, 26 which are, for example, a connector. Consequently, when it is necessary to urgently change a layout of the robot 1 including the rotation axis module 10, the relay portions 25, 26 are detached from relay portions (described below) in the first link 11 and the second link 12 and reconnected, only whereby a drive circuit of the rotation axis module 10 can be created. Thus, rearrangement of the robot 1 can be easily performed. Similarly, for robot manufacturing makers, by manufacturing the rotation axis module as a unit, it is unnecessary to perform a disposition of a cable movable portion during assemblage of the robot, while merely, relay connectors are made to be fitted so that a robot assemblage system using the rotation axis module 10 which allows the relay connectors to be fitted by using a vision, such as a visual sensor, and the robot can be constructed.

Figure 3:
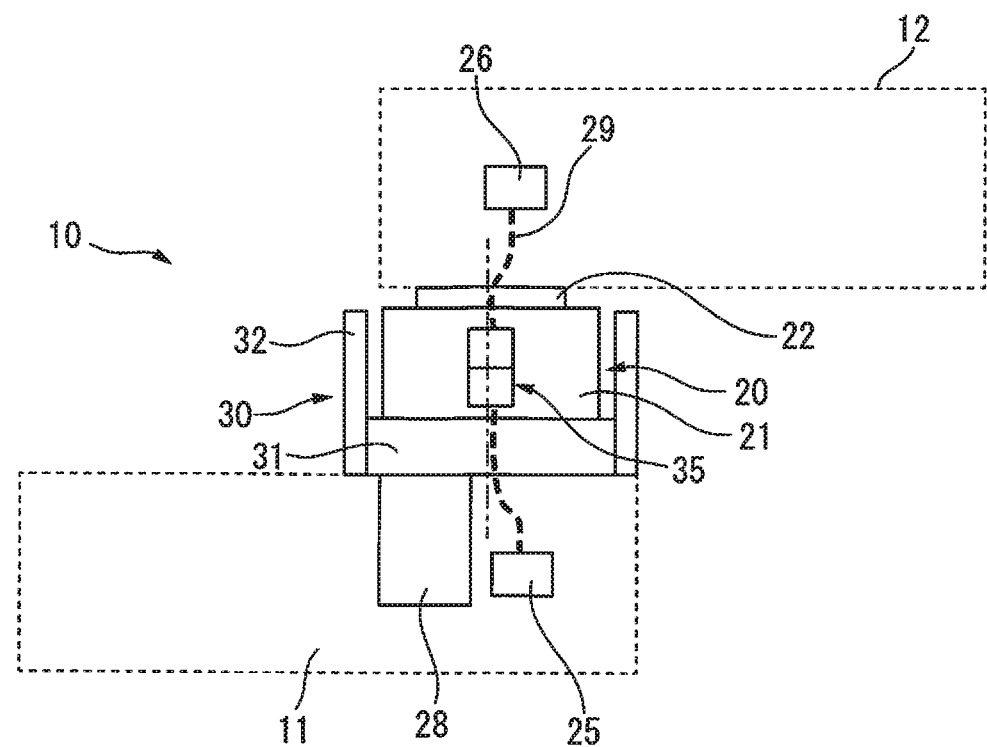
FIG. 3 is a second enlarged view of the rotation axis module.

FIG. 3 is a second enlarged view of the rotation axis module. In FIG. 3, in the actuator 20, a wireless transmission unit 35 which transmits electricity is provided halfway of the umbilical member 29. The wireless transmission unit 35 can transmit power and an encoder signal for driving the actuator 20, or power and an encoder signal for a tool drive motor. A boundary portion between the movable member and the fixed member is disposed in such a manner as to correspond to a boundary portion between a transmission side member and a reception side member of the wireless transmission unit 35. For the wireless transmission unit 35, currently there are an electromagnetic induction method, an electromagnetic resonance method, an electromagnetic wave method, and the like, any of which may be employed. Note that the wireless transmission unit 35 is an element which transmits electricity to a vacant space, but fails to supply air. Further, in a configuration as illustrated in FIG. 3, the first fixing portion 23 and the second fixing portion 24 can be omitted. However, it is needless to say that the transmission side member of the wireless transmission unit 35 and the reception side member of the wireless transmission unit 35 require an element for fixing to the fixed member 21 and the movable member 22, respectively.

Thus, even when the rotation axis module 10 is used for a long period, an area of the wireless transmission unit 35 deteriorates and the lifetime of the rotation axis module 10 can be expected to be longer. Because abrasion due to sliding movements between components fails to occur as wireless. Further, in the area of the wireless transmission unit 35, a necessity to take care such that the umbilical member 29 does not intersect with each other can be excluded.

Figure 4:
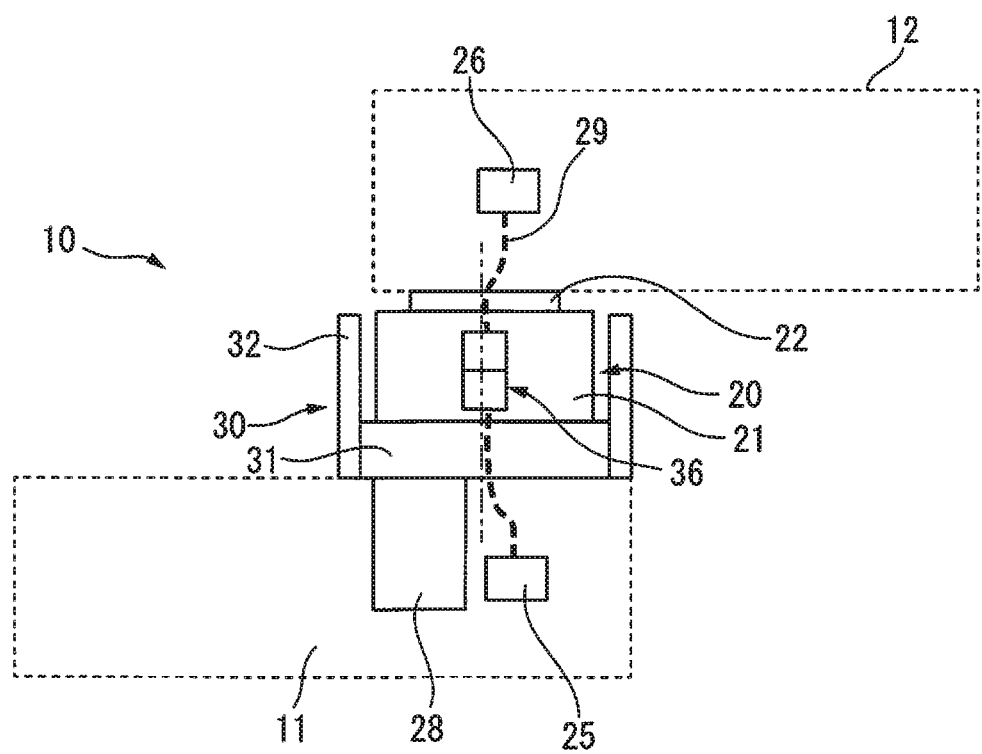
FIG. 4 is a third enlarged view of the rotation axis module.

Further, FIG. 4 is a third enlarged view of the rotation axis module. In FIG. 4, a rotary joint 36 which supplies electricity and air is provided halfway of the umbilical member 29 in place of the wireless transmission unit 35.

The rotary joint 36 is a mechanical element capable of transmission even when a corresponding axis continuously rotates without limitation. The rotary joint 36 can transmit, for example, power and an encoder signal for driving the actuator 20, or power and an encoder signal for a tool drive motor. Further, the rotary joint 36 can also supply tool drive air. In addition, in a configuration as illustrated in FIG. 4, the first fixing portion 23 and the second fixing portion 24 can be omitted. However, it is needless to say that an input side member of the rotary joint 36 and an output side member of the rotary joint 36 require an element for fixing to the fixed member 21 and the movable member 22, respectively.

In such a configuration, the rotary joint 36 can transmit electricity and air while rotating so that a twisting disposition of the umbilical member 29 can be easily performed. In addition, in an area of the rotary joint 36, it is also unnecessary to take care such that the umbilical member 29 does not intersect with each other. Further, using the rotary joint enables transmission of air and also allows a tool (unillustrated) provided at the tip end of the robot 1 to be controlled.

Figure 5:
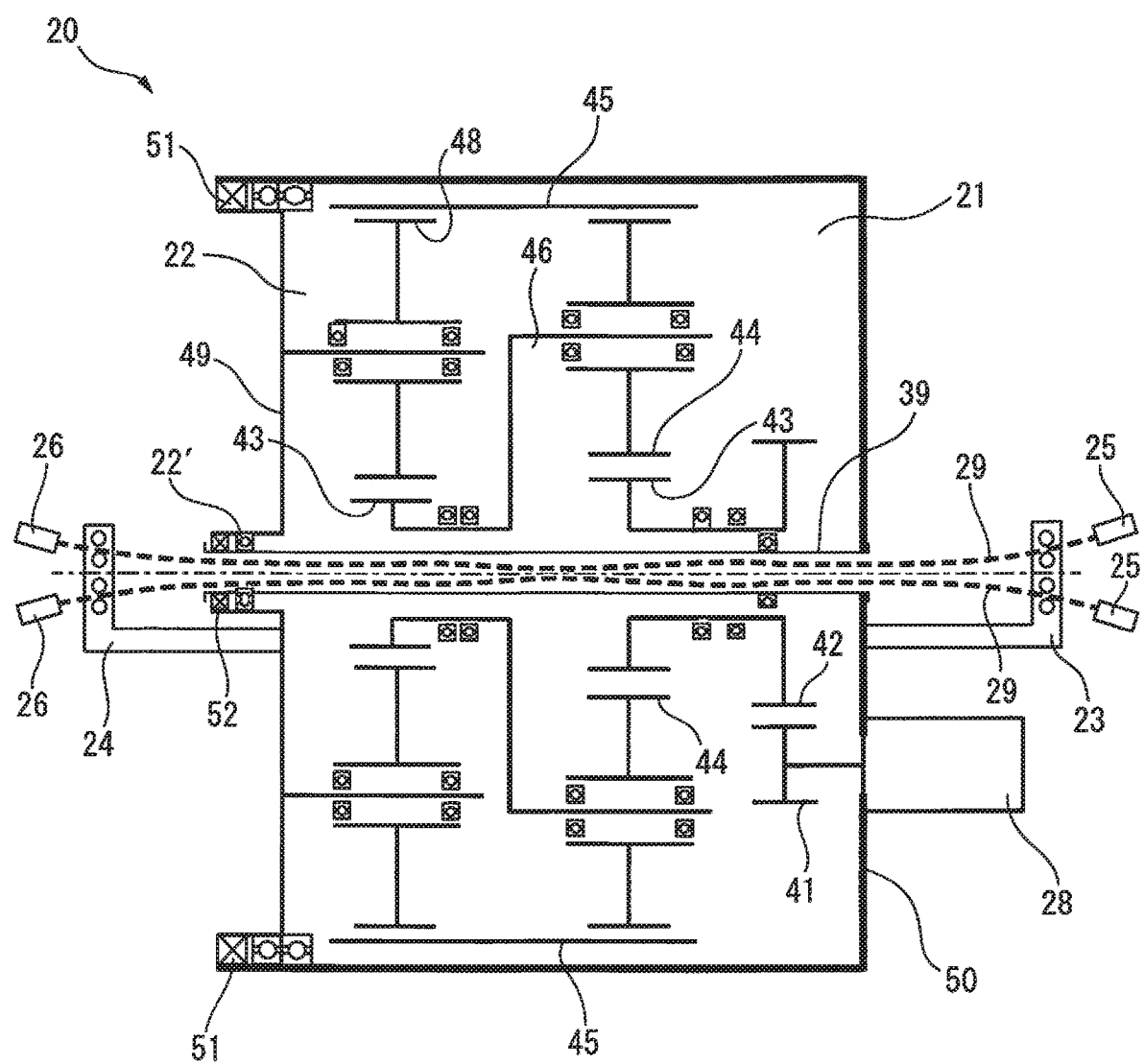
FIG. 5 is an enlarged cross-sectional view of the rotation axis module according to an embodiment.

FIG. 5 is an enlarged cross-sectional view of the rotation axis module according to an embodiment. As illustrated in FIG. 5, at the center of the rotation axis module 10, a pipe-shaped member 39 is disposed in such a manner as to penetrate through the rotation axis module 10. At the fixed member 21 side, the first fixing portion 23 is provided in the vicinity of the pipe-shaped member 39, and at the movable member 22 side, the second fixing portion 24 is provided in the vicinity of the pipe-shaped member 39, The first fixing portion 23 and the second fixing portion 24 are a member having a substantial L shape which extends from the fixed member 21 and the movable member 22, respectively, and fix the umbilical member 29 at a tip end thereof. Note that in FIG. 5, two pieces of umbilical member 29 which penetrate through the pipe-shaped member 39 are illustrated, and are fixed using the first fixing portion 23 and the second fixing portion 24 by a fixing tool, such as a nylon strap.

The rotation axis module 10 as illustrated in FIG. 5 includes a speed reducer. To an output axis of the motor 28, a first spur gear 41 is mounted. The first spur gear 41 is engaged with a second spur gear 42 arranged around the pipe-shaped member 39. A third spur gear 43 which is integral with the second spur gear 42 is engaged with a plurality of, for example, three fourth spur gears 44 as planetary gears of a sun gear 45 (fifth spur gear). A front-stage carrier 46 of the fourth spur gears 44 is engaged with a seventh spur gear 47 arranged around the pipe-shaped member 39.

Next, the seventh spur gear 47 is engaged with a plurality of, for example, three eighth spur gears 48 as planetary gears of the sun gear 45 (fifth spur gear). Then, a rear-stage carrier 49 of the eighth spur gears 48 has an output axis 22' of the movable member 22. Such a mechanism is known and accordingly detailed description thereof will be omitted. Note that in such a case, the motor 28 may include a brake.

As apparent from FIG. 5, a plurality of support axes to which the spur gears 41, 42, 43, 47 are mounted are parallel to each other, and also parallel to the output axis 22'. Then, as is obvious, such support axes are rotatably supported by a plurality of ball bearings. In rolling bearings, the ball bearings have the smallest rolling friction, and accordingly provide the smallest heat loss and also exhibit the least efficiency decrease.

Such a configuration can intentionally improve a reverse efficiency of the speed reducer so that an external force applied to the links come to be easily transmitted to the motor 28 itself. Note that the reverse efficiency in the present specification signifies an efficiency when the drive motor 28 is allowed to rotate from a second link 12 side. Thus, when the robot 1 comes into contact with a person and a peripheral device, by using a servo feedback control, the robot can be immediately stopped without using a contact sensor. In addition, usefulness is exhibited also for a function of operation in which a robot user directly moves the links and a tool portion of the robot (leadthrough), and the like. Such a matter is particularly advantageous when a person and the robot 1 cooperatively operate. Note that in FIG. 5, the plurality of support axes parallel to each other are illustrated, which, however, may be intersecting axes, and further, in place of the spur gears, bevel gears may be used.

Further, as illustrated in FIG. 5, the speed reducer of the rotation axis module 10 is substantially housed in a housing 50 having a box shape. Then, at a gap between the rear-stage carrier 49 and the housing 50, a first oil seal 51 is arranged. Further, at an inner side of the pipe-shaped member 39, a second oil seal 52 is arranged.

Such a configuration allows a lubricant in the actuator 20 to be completely enclosed, and a sealing property can be assured only by the rotation axis module 10. Consequently, at sides of the first link 11 and the second link 12, a sealing structure is unnecessary. Thus, it will be apparent that an operation property to rearrange the robot 1 can be improved and rearrangement in a short time can be performed.

Further, in FIG. 5, the umbilical member 29 penetrating in the interior of the pipe-shaped member 39 may be fixed using a hole portion at a tip end of the first fixing portion 23 and the second fixing portion 24 by a fixing tool, such as a nylon strap. In such a case, if the band at the first fixing portion 23 and the second fixing portion 24 is cut, the umbilical member 29 can be pulled out from the pipe-shaped member 39. The umbilical member 29 is fixed only by the first fixing portion 23 and the second fixing portion 24 so that in the present invention, the umbilical member 29 can be easily detached and attached.

As apparent from illustration of the two pieces of umbilical member 29 in FIG. 5, another umbilical member 29 provided with the relay portions 25, 26 can be made to pass through the pipe-shaped member 39 and disposed in the rotation axis module 10. Another umbilical member 29 may be, for example, a tool drive cable and an air tube. Thus, when the robot 1 which is to be newly rearranged necessitates including a tool, another umbilical member 29 can be easily added afterwards for such a tool. Further, if the tool is mounted with an additional axis motor, a umbilical member for driving an additional axis can be also added.

Figure 6A:
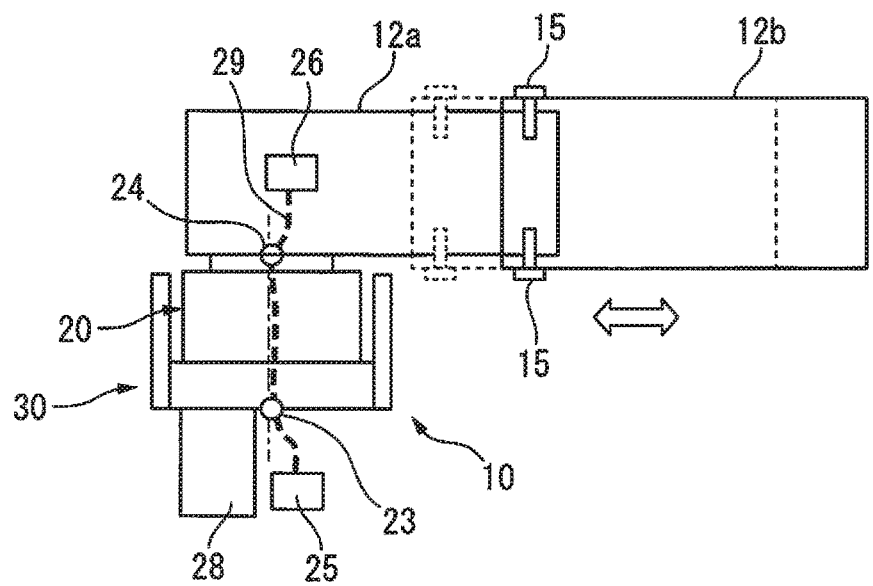
FIG. 6A is a partial enlarged view illustrating a part of one joint portion of the robot in an enlarged manner.

FIG. 6A is a partial enlarged view illustrating a part of one joint portion of the robot in an enlarged manner. In FIG. 6A, the second link 12 consists of a link portion 12a which is directly linked to the movable member 22 of the rotation axis module 10 and a link portion 12b which extends in a longitudinal direction of the link portion 12a.

As apparent from FIG. 6A, a sectional area of the link portion 12a is slightly smaller than a sectional area of the link portion 12b, and accordingly the link portion 12a can slide in the link portion 12b. Then, the link portion 12a is provided with a plurality of holes (unillustrated) which are sequentially formed in the longitudinal direction or a slit (unillustrated) which extends in the longitudinal direction.

The link portion 12b is made to relatively slide with respect to the link portion 12a, and the link portion 12b is fixed to the link portion 12a at a desired position by a retainer 15. Thus, by using a change mechanism portion including the link portions 12a, 12b, the retainer 15, and the like, a link length of the second link 12 can be easily changed. Therefore, it will be apparent that the degree of freedom of application of the robot 1 can be improved. Note that the first link 11 may have a configuration similar to that of the second link 12. In addition, the link portion 12b may be fixed to the link portion 12a by a means other than the retainer 15.

Figure 6B:
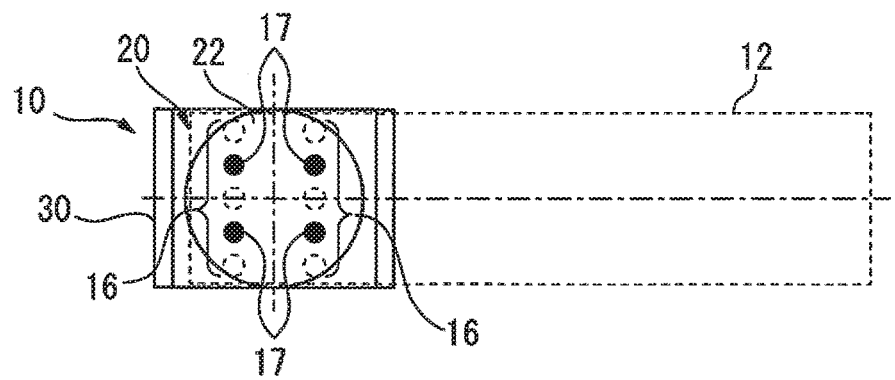
FIG. 6B is a first top view of one joint portion of the robot.

Further, FIG. 6B is a first top view of one joint portion of the robot. As illustrated in FIG. 6B, the second link 12 is provided with a plurality of, for example, multiples of four holes 16 which are sequentially formed in a transverse direction. Alternatively, in place of the plurality of holes 16, a slit which extends in the transverse direction (unillustrated) may be provided to the second link 12.

Still further, at a top surface of the movable member 22, four female fasteners arranged in a rotationally symmetrical manner are formed around the center of the movable member 22. The four female fasteners of the movable member 22 are made to correspond to the holes 16 of the second link 12, and the second link 12 is fixed to the movable member 22 by retainers 17.

In FIG. 6B, a diameter of the movable member 22 and a transverse length of the second link 12 are equal to each other. Then, in FIG. 6B, the second link 12 is fixed to the movable member 22 in such a manner that the center of the movable member 22 is positioned over a center line of the second link 12.

Figure 6C:
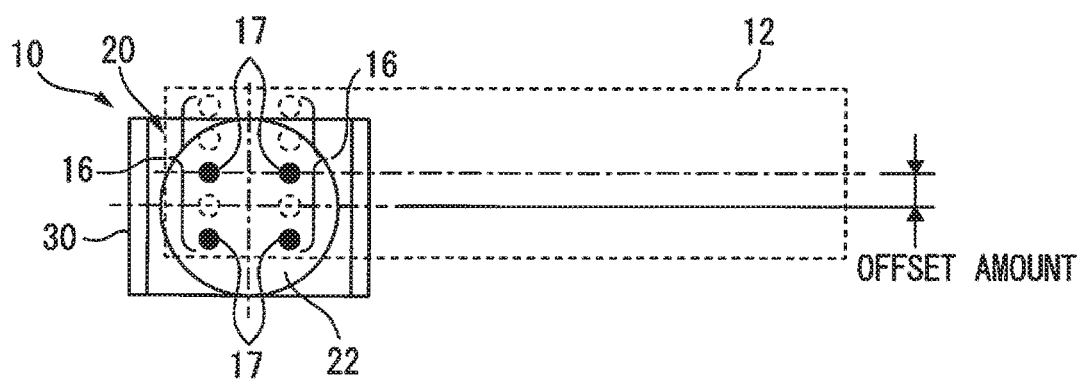
FIG. 6C is a second top view of one joint portion of the robot.

FIG. 6C is a second top view of one joint portion of the robot. In FIG. 6C, the link 12 is determined to be positioned in such a manner that the center of the movable member 22 is away from the center line of the second link 12. Then, at such a position, the retainers 17 are allowed to pass through the holes 16 of the second link 12 which correspond to the four holes of the movable member 22 to fix the second link 12 to the movable member 22. Thereby, by an offset amount as illustrated in FIG. 6C, the second link 12 can be offset.

Thus, by using a change mechanism portion including the female fasteners of the movable member 22, the holes 16 of the second link 12, the retainers 17, and the like, the offset amount of the second link 12 can be easily changed. Therefore, it will be apparent that the degree of freedom of application of the robot 1 can be improved. Note that the number of holes of the movable member 22 and that of the second link 12 may be different from each other, and further, the second link 12 may be fixed to the movable member 22 by a means other than the retainers 17. Although unillustrated, it is also possible that between the movable member 22 and the second link 12, for example, two pins are used together, thereby enhancing a connection accuracy of the movable member 22 and the second link 12 and improving an accuracy of the robot.

Referring to FIG. 2 again, the case 30 of the rotation axis module 10 includes a first attachment portion 31 at which the fixed member 21 is disposed and a second attachment portion 32 which extends perpendicularly relative to the first attachment portion 31. In FIG. 2, two of the second attachment portions 32 extend from both ends of the first attachment portion 31. An upper end portion of the second attachment portion 32 is substantially flush with an upper end surface of the fixed member 21. Further, as apparent from the rotation axis module 10 for the joint axis J1 in FIG. 1, the first attachment portion 31 and the second attachment portion 32 are for example a plate-shaped member having a rectangular shape. The first attachment portion 31 and the second attachment portion 32 are desirably structured integrally. Further, such portions may be structured integrally with the fixed member 21.

At an exposed surface (rear surface) of the first attachment portion 31, an interface for attaching the first link 11 and/or the second link 12 is provided. Then, at an exposed surface (outer surface) of the second attachment portion 32, an interface for attaching the first link 11 and/or the second link 12 is provided. The interfaces mounted to the first attachment portion 31 and the second attachment portion 32 are common. Further, such interfaces are favorably common also to the interface provided at the movable member 22. Accordingly, in rearrangement, a direction of the first link 11 and the second link 12 is also easily changed.

Referring to FIG. 1, to the first attachment portion 31 and the movable portion 22 of the rotation axis module 10 for the joint axis J2, two of the arm portions of the robot 1 (corresponding to the first link 11 and the second link 12) are attached. Further, to the second attachment portion 32 and the movable portion 22 of the rotation axis module 10 for the joint axis J3, two of the arm portions of the robot 1 are attached.

Figure 7:
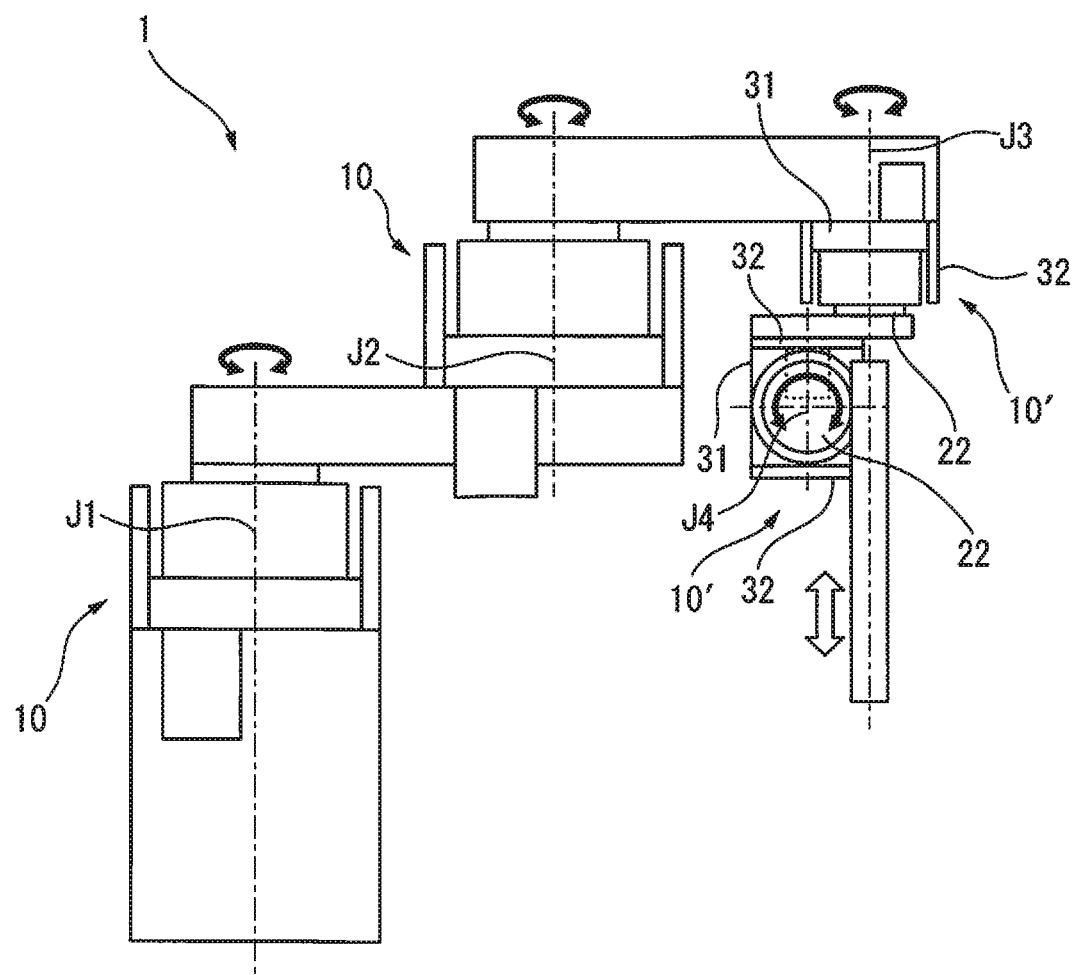
FIG. 7 is a side view of another robot including the rotation axis module of the present invention.

Further, FIG. 7 is a side view of another robot including the joint portion of the present invention. In FIG. 7, the robot 1 including four of the joint axes, i.e. a four-axis SCARA robot is illustrated. The robot 1 as illustrated in FIG. 7 includes the two identical rotation axis modules 10 which are arranged at the based end side of the robot 1 and the two identical rotation axis modules 10' which are arranged at the terminal end side of the robot 1.

In FIG. 7, to the first attachment portion 31 and the movable portion 22 of the rotation axis module 10' for the joint axis J3, two of the arm portions of the robot 1 are attached. Then, to the second attachment portion 32 and the movable portion 22 of the rotation axis module 10' for the joint axis J4, two of the arm portions of the robot 1 are attached. It will be apparent that in such a case, if a pinion is provided to the movable portion 22 of the rotation axis module 10' for the joint axis J4 and a rack is provided on the arm, a rotational movement can be converted to a linear movement, and the arm portions as attached can be configured in such a manner as to perform a linear movement.

As apparent from FIG. 1 and FIG. 7, in the present invention, to any two of the movable member 22, the first attachment portion 31, and the second attachment portion 32 of the rotation axis modules 10, 10', two of the arm portions of the robot 1 can be attached. Thus, the rotation axis module 10 is physically linked via the movable member 22 and the attachment portions 31, 32 to the first link 11 and the second link 12.

Consequently, in the present invention, the rotation axis modules 10, 10' can be used in various axis configurations, and as a result, an axis configuration of the robot 1 can be easily changed. Further, as apparent from comparison between FIG. 1 and FIG. 7, the number of joint axes of the robot 1 can be also different. Thus, it will be apparent that in the present invention, the rotation axis modules 10, 10' having the same configuration and plural types of link members are combined to be used so that the degree of freedom of application of the robot 1 can be further improved. As a matter of course, an axis configuration of a combination of FIG. 1 and FIG. 7 and the like can be realized.

Figure 8:
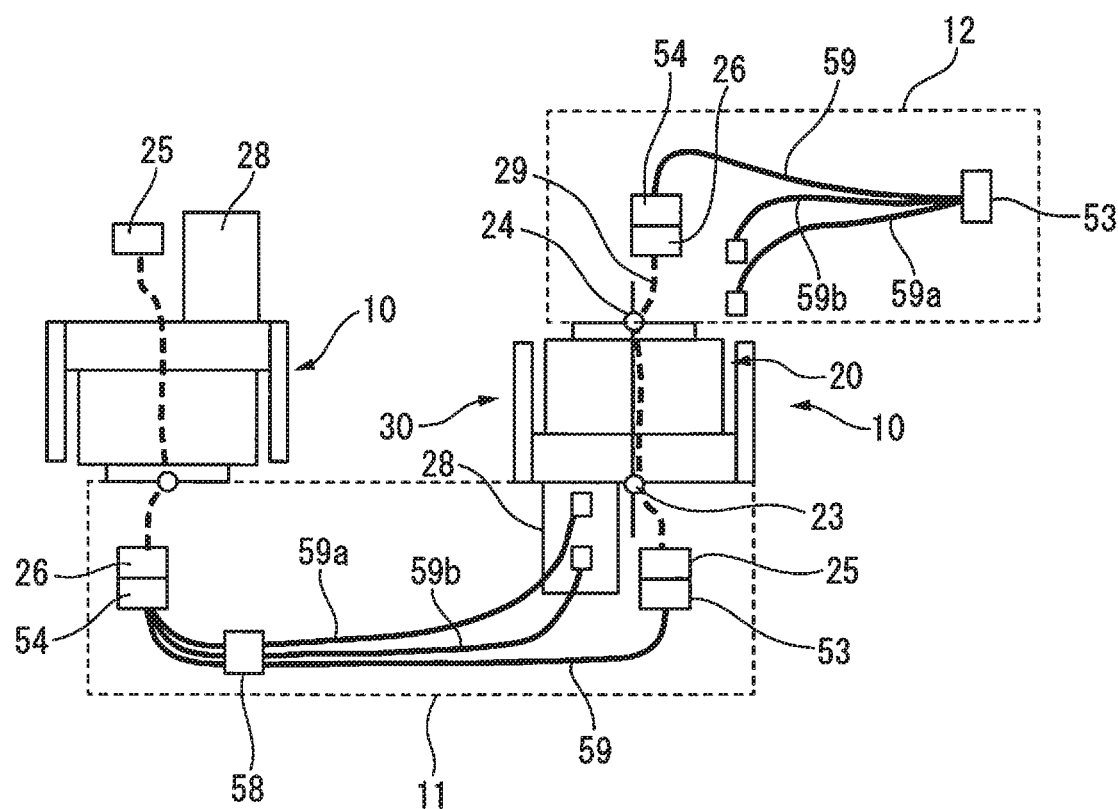
FIG. 8 is a diagram illustrating two of the rotation axis modules.

FIG. 8 is a diagram illustrating two of the rotation axis modules. In FIG. 8, in the first link 11 and the second link 12, a relay umbilical member 59 is arranged. One end of the relay umbilical member 59 is connected to a third relay portion 53, and the other end is connected to a fourth relay portion 54. As illustrated in FIG. 8, a combination of the relay umbilical member 59, the third relay portion 53, and the fourth relay portion 54 is completely housed in the first link 11 and the second link 12.

Then, as apparent from FIG. 8, the first relay portion 25 of the rotation axis module 10 extends in the first link 11 and is connected to the third relay portion 53. Further, the second relay portion 26 of the rotation axis module 10 extends in the second link 12 and is connected to the fourth relay portion 54. In other words, the first relay portion 25 and the second relay portion 26 of the rotation axis module 10 are connected to the relay portions in the respectively different links. As a matter of course, the relay portions may be assembled with the case 30 and the movable member 22.

Further, the third relay portion 53 and the fourth relay portion 54 in the first link 11 and the second link 12 are desirably fixed to a predetermined portion after connected. Thereby, even if the robot 1 operates so that the first link 11 and the like rock, a connection between the third relay portion 53 and the fourth relay portion 54 can be prevented from being detached. Further, a circuit of the relay umbilical member 59 is favorably different for each link, thereby being capable of minimizing the circuit.

Thus, in the present invention, the rotation axis module 10 is electrically linked via the relay portions 25, 26 of the rotation axis module 10 and the relay portions 53, 54 in the links to the first link 11 and the second link 12. Therefore, it will be apparent that arrangement can be made merely by detachment of the relay portions and reconnection so that assemblage of the robot 1 becomes extremely easy.

Further in FIG. 8, from the fourth relay portion 54 of the first link 11, two branch umbilical members umbilical members 59a, 59b are branched, and also from the third relay portion 53 of the second link 12, the two branch umbilical members 59a, 59b are branched. The branch umbilical members 59a, 59b can be a power wire and a signal wire for the rotation axis module. In FIG. 8, the two branch umbilical members 59a, 59b extending from the fourth relay portion 54 of the first link 11 are connected to the motor 28. Thus, it will be apparent that in the present invention, the relay umbilical member 59 and the associated members have an extremely simply configuration, and as a result, assemblage of the robot 1 can be extremely easily and promptly performed.

Figure 9A:
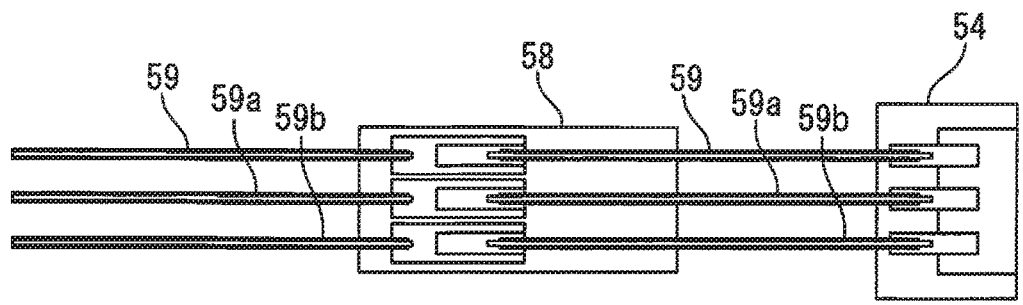
FIG. 9A is a first enlarged view of a relay umbilical member including a change portion.

Further, in FIG. 8, an arrangement change portion 58 which changes arrangement of the relay umbilical member 59 of the first link 11 and at least one of the branch umbilical members 59a, 59b is included. Note that the relay umbilical member 59 of the second link 12 may include a similar change portion. FIGS. 9A-9D are an enlarged view of the relay umbilical member including the change portion. In FIG. 9A, the relay umbilical member 59 and the branch umbilical members 59a, 59b extending from the fourth relay portion 54 are illustrated sequentially from the top. The arrangement change portion 58 is connected halfway of the relay umbilical member 59 and the branch umbilical members 59a, 59b.

Figure 9B:
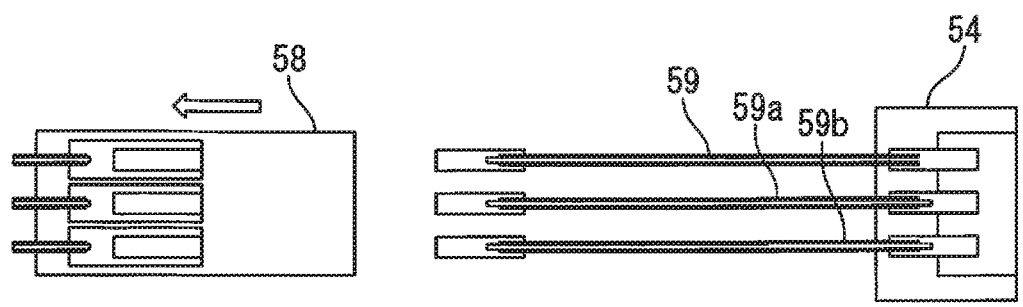
FIG. 9B is a second enlarged view of the relay umbilical member including the change portion.

The arrangement change portion 58 is an insulation covered portion capable of sliding in a longitudinal direction, and includes in the interior thereof a plurality of, for example, three terminals in the present embodiment. As illustrated in FIG. 9B, if the arrangement change portion 58 is moved, the relay umbilical member 59 and the branch umbilical members 59a, 59b are each electrically disconnected.

Figure 9C:
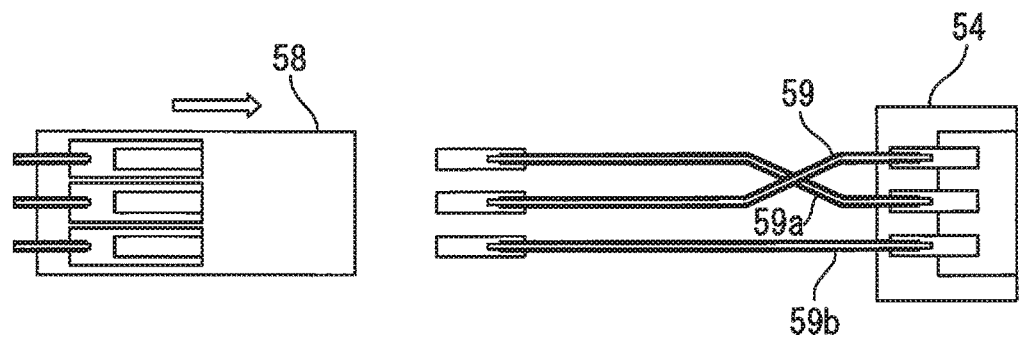
FIG. 9C is a third enlarged view of the relay umbilical member including the change portion.
Figure 9D:
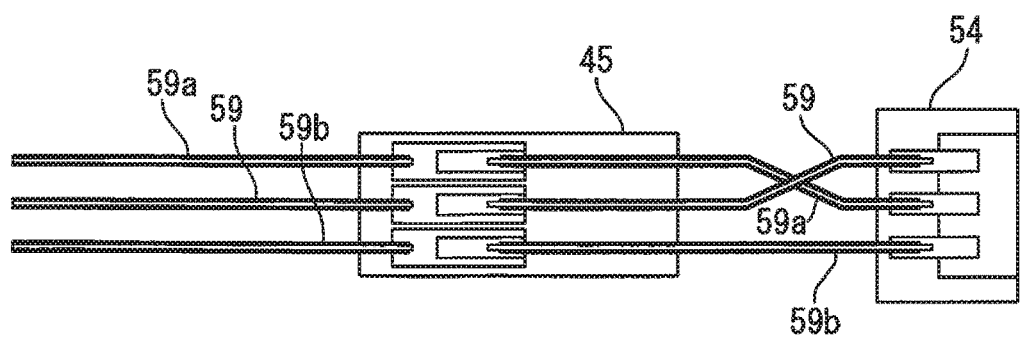
FIG. 9D is a fourth enlarged view of the relay umbilical member including the change portion.

Next, as illustrated in FIG. 9C, a part of the umbilical members, for example, arrangement of the relay umbilical member 59 and the branch umbilical member 59a is switched. Then, as illustrated in FIG. 9D, the arrangement change portion 58 is restored. Thereby, at a left side of the arrangement change portion 58, the branch umbilical member 59a, the relay umbilical member 59, and the branch umbilical member 59b are arranged sequentially from the top. Consequently, a minimum configuration allows arrangement of the relay umbilical member and the like to be changed, the number of necessary circuits can be minimum, and costs of the relay umbilical member and the like can be further reduced. Further, it is needless to say that connection pin portions of the branch umbilical member 59a, the relay umbilical member 59, and the branch umbilical member 59b in FIGS. 9A-9D may be each an independent connector.

Figure 10A:
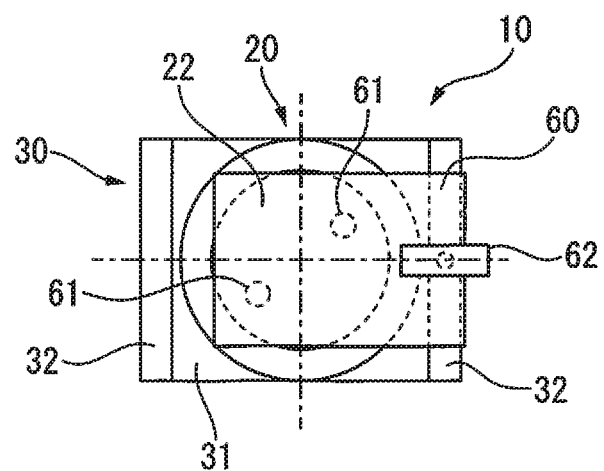
FIG. 10A is a third top view of the rotation axis module.
Figure 10B:
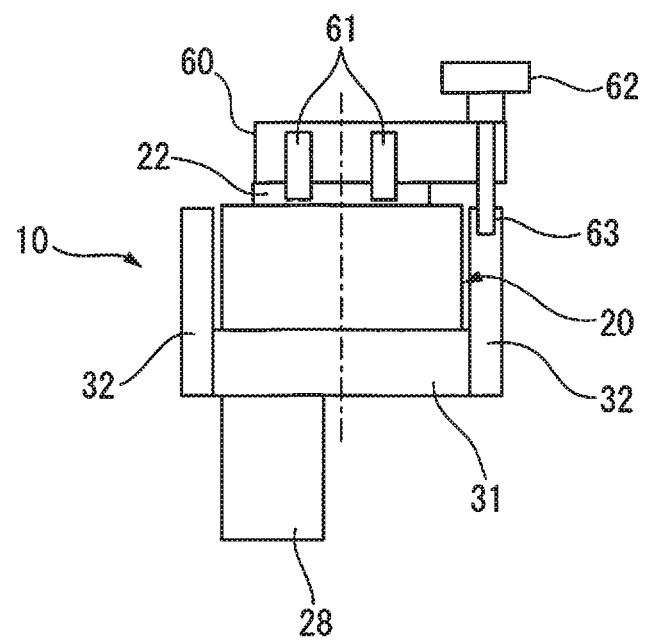
FIG. 10B is a side view of the rotation axis module as illustrated in FIG. 10A.

FIG. 10A is a third top view of the rotation axis module, and FIG. 10B is a side view of the rotation axis module as illustrated in FIG. 10A. In these drawings, the first link 11 and the second link 12 are not attached to the rotation axis module 10. As illustrated in FIGS. 10A and 10B, at the top surface of the movable member 22 of the rotation axis module 10, a position determination block 60 is disposed. A bottom surface of the position determination block 60 which abuts against the movable member 22 covers an area containing at least the center of the movable member 22 and one of the second attachment portions 32.

In addition, the position determination block 60 is fixed to the movable member 22 by two position determination pins 61. In FIG. 10A, the position determination pins 61 are arranged at positions away from the center of the movable member 22 in an opposite direction by an equal distance. Note that the two position determination pins 61 may be arranged at the other positions on the movable member 22.

Further, into a single through hole formed at an upper surface of the position determination block 60, a fixing pin 62 is inserted. Then, at an upper end of the second attachment portion 32, a single pin hole 63 is formed. As illustrated in FIG. 10B, the fixing pin 62 is made to pass through the through hole of the position determination block 60, and a tip end thereof is made to be engaged with the pin hole 63 of the upper end of the second attachment portion 32. Thereby, in a state as illustrated in FIG. 10B, the movable member 22 of the rotation axis module 10 fails to rotate relative to the case 30. Note that in such an operation, the brake of the drive motor 28 is released, and performing in a state in which the movable member 22 of the rotation axis module can be allowed to freely rotate from the movable member 22 side is good in operationality and desirable.

Such a state is created using the position determination pins 61 and the fixing pin 62, and such a state is set as a reference posture. In other words, the position determination pins 61, the fixing pin 62, and the pin hole 63 serve as a definition mechanism portion which defines the reference posture. Thereby, in the present invention, calibration of an axis origin position of the rotation axis module 10 can be performed using one axis. Thus, also when the first link 11 and the second link 12 are not attached, calibration of an origin position of the robot 1 can be easily performed.

In conventional techniques, mastering (axis calibration) has been performed using a jig with respect to all the axes of the robot 1. However, in the present invention, the number of operation axes can be reduced so that a labor of such mastering can be reduced. In addition, even when the rotation axis module 10 of one axis of the robot 1 is replaced, if such rotation axis module is subjected to mastering in advance before replaced, a necessity to perform mastering of the robot 1 again can be excluded. Further, because also mastering itself of the rotation axis module 10 becomes an easy matter performed by merely allowing the axis to rotate and inserting a jig, such as the position determination block 60, and the associated members, a mastering operation itself can be configured to be simple.

Figure 11A:
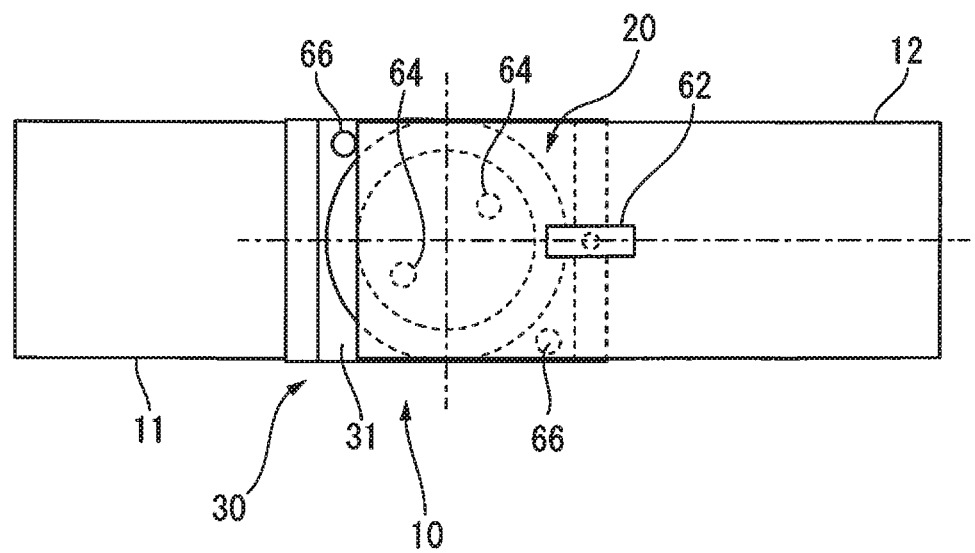
FIG. 11A is a fourth top view of one joint portion of the robot.
Figure 11B:
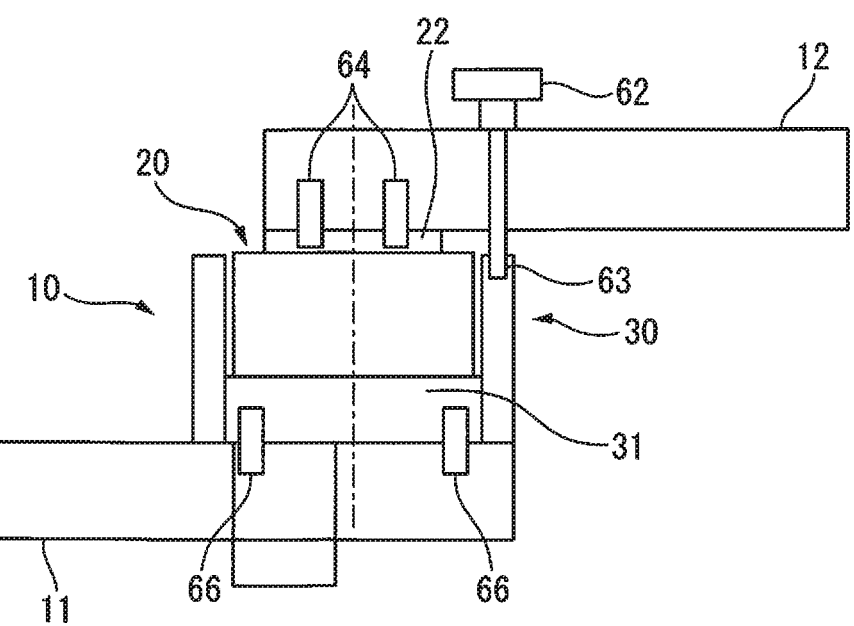
FIG. 11B is a side view of one joint portion of the robot as illustrated in FIG. 11A.

Further, FIG. 11A is a fourth top view of one joint portion of the robot, and FIG. 11B is a side view of one joint portion of the robot as illustrated in FIG. 11A. In these drawings, the first link 11 and the second link 12 are attached to the rotation axis module 10. As illustrated in these drawings, the second link 12 is fixed to the movable member 22 by two position determination pins 64. In FIG. 11A, the position determination pins 64 are arranged at positions away from the center of the movable member 22 in an opposite direction by an equal distance.

Further, the first link 11 is fixed to the first attachment portion 31 by two position determination pins 66. As illustrated in FIG. 11A, the two position determination pins 66 are arranged at corner positions of the first attachment portion 31 not to influence fixing of the actuator 20. In addition, a segment between the two position determination pins 66 is favorably perpendicular to a segment between the two position determination pins 64. Note that the position determination pins 64, 66 may be arranged at the other positions on the movable member 22 and the first attachment portion 31.

Then, similarly as described above, the fixing pin 62 is made to pass through a through hole of the second link 12, and a tip end of the fixing pin 62 is made to be engaged with the pin hole 63 of the upper end of the second attachment portion 32. Thereby, in a state as illustrated in FIG. 11B, the movable member 22 and the second link 12 of the rotation axis module 10 fail to rotate relative to the case 30 and the first link 11.

Such a state is created using the position determination pins 64, 66 and the fixing pin 62, and such a state is set as a reference posture. In other words, the position determination pins 64, 66, the fixing pin 62, and the pin hole 63 serve as the definition mechanism portion which defines the reference posture. Thereby, in the present invention, calibration of the axis origin position of the rotation axis module 10 can be performed. Thus, it will be apparent that also when the first link 11 and the second link 12 are attached, effects similar to those as described above are obtained. Not only such a method using such pins but also a mastering method using a vision and the like may be suitable.

Figure 12:
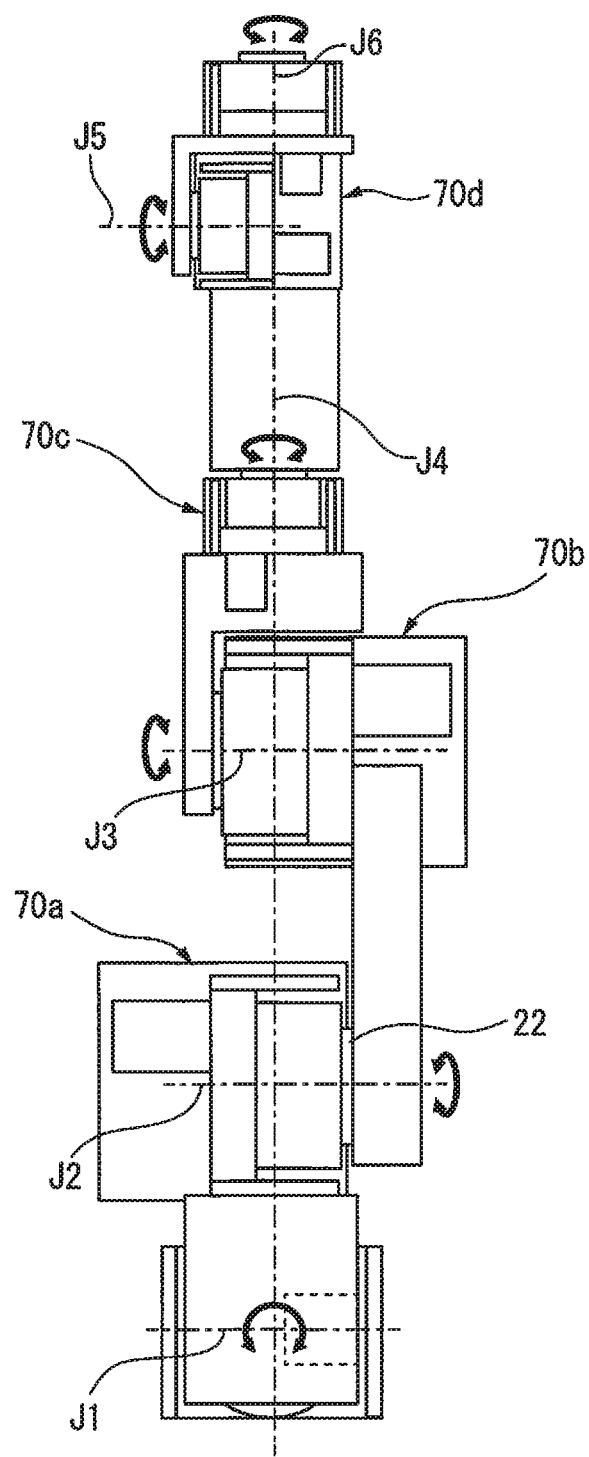
FIG. 12 is another top view of the robot including the rotation axis module of the present invention.

Further, FIG. 12 is another top view of the robot including the rotation axis module of the present invention. The robot 1 as illustrated in FIG. 12 has the same configuration and the same posture as the robot 1 as illustrated in FIG. 1. In FIG. 12, the rotation axis modules 10, 10' and a part of associated arm members are covered by covers 70a-70d.

The first attachment portion 31, the second attachment portion 32, and the like of the rotation axis module 10 are provided with female fasteners in advance. Thus, the covers 70a-70d are bolted to be fixed using the female fasteners. The covers 70a-70d are made of a material which soften an impact, such as a resin, and serve for protecting the rotation axis modules 10, 10'. Thus, a particular advantage is exhibited when the robot 1 cooperatively operates with a person.

Figure 13:
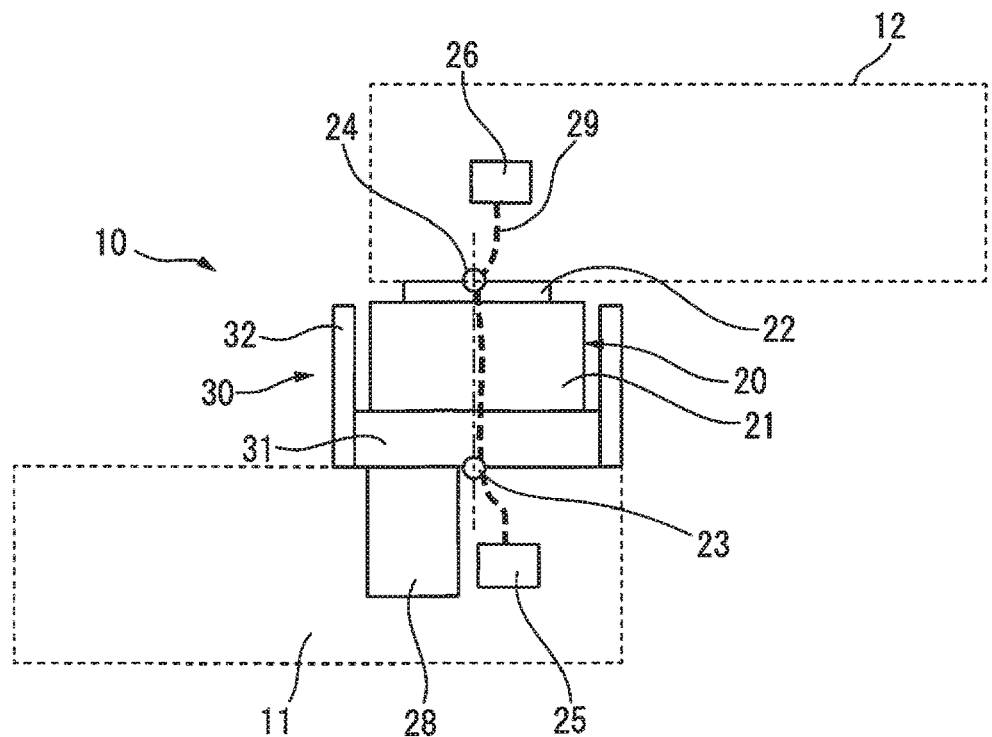
FIG. 13 is a fourth enlarged view of the rotation axis module.

Further, FIG. 13 is a fourth enlarged view of the rotation axis module. In FIG. 13, between the first relay portion 25 and the actuator 20, the umbilical member 29 is fixed by the first fixing portion 23 at a rotation axis of the fixed member 21 or in the vicinity thereof. Further, between the second relay portion 26 and the actuator 20, the umbilical member 29 is fixed by the second fixing portion 24 at the output axis of the movable member 22 or in the vicinity thereof. In such a case, the umbilical member 29 can be fixed around the center of the actuator 20 to both ends thereof.

Figure 14:
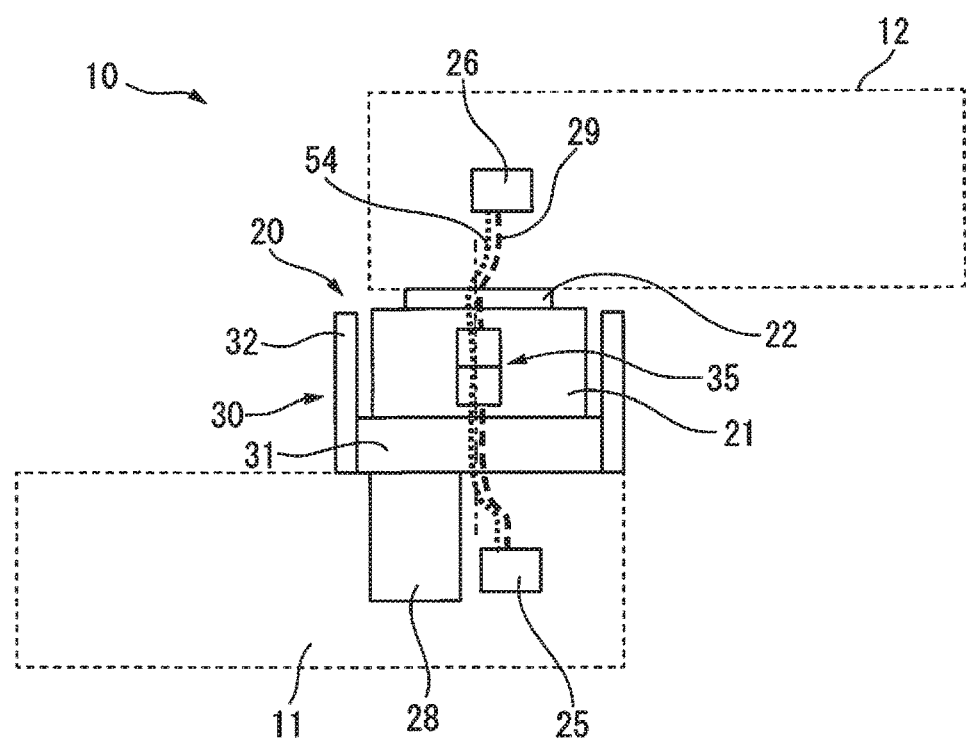
FIG. 14 is a fifth enlarged view of the rotation axis module.

FIG. 14 is a fifth enlarged view of the rotation axis module. FIG. 14 is a modification of FIG. 3, and the wireless transmission unit 35 has a hollow structure. Then, an air supply tube 54 which extends along the rotation axis of the movable member 22 passes through a hollow portion of the wireless transmission unit 35. The wireless transmission unit 35 itself fails to supply air, but in a configuration as illustrated in FIG. 14, air can be supplied using the air supply tube 54. Thereby, stresses applied to the air tube become only a twisting movement so that the lifetime of the air tube can be extended.

Figure 15:
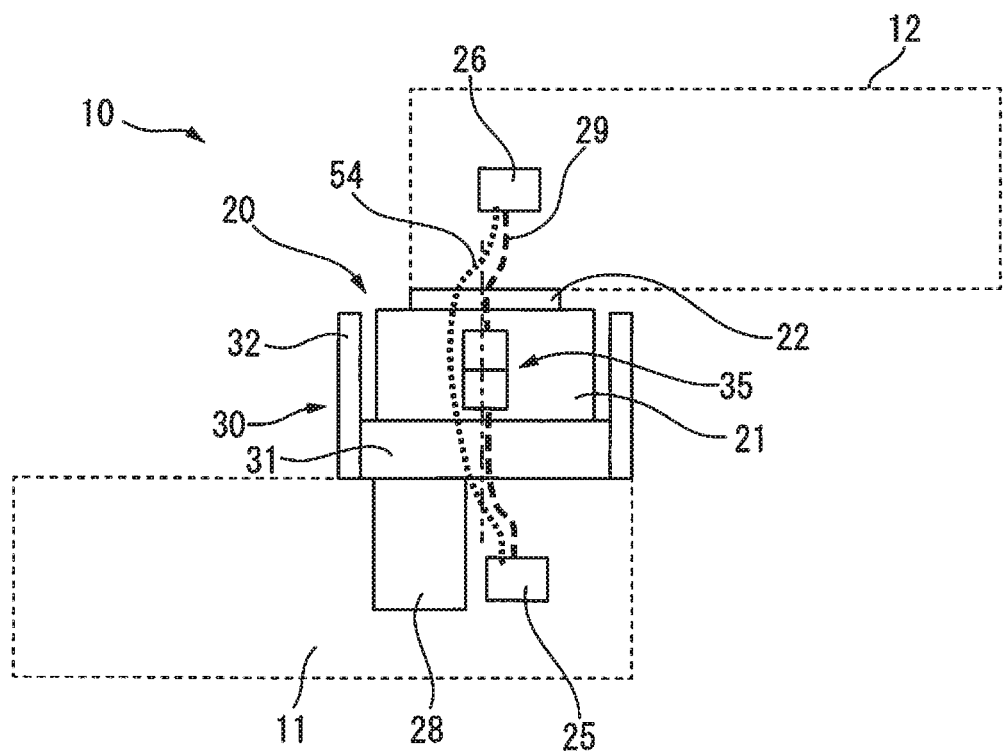
FIG. 15 is a sixth enlarged view of the rotation axis module.

Further, FIG. 15 is a sixth enlarged view of the rotation axis module. FIG. 15 is another modification of FIG. 3. In FIG. 15, the air supply tube 54 which extends along the rotation axis of the movable member 22 is disposed outside the wireless transmission unit 35. In such a case, the air tube is desirably treated by being wound into a coil shape on a wireless transmission unit cylinder outer peripheral surface. The air tube is wound into a coil shape so that the air tube expands and contracts to be capable of following also a rotational movement about an axis center of the coil as a rotation axis. Also in such a case, air can be supplied using the air supply tube 54. In configurations as illustrated in FIGS. 14 and 15, when the rotation axis module 10 is a part of the robot 1, air can be supplied to a tool (unillustrated) of the robot by the air supply tube 54, which is thus advantageous. Accordingly, the wireless transmission unit itself does not necessitate a hollow structure, and the wireless transmission unit can be made to be compact and costs can be reduced.

Figure 16:
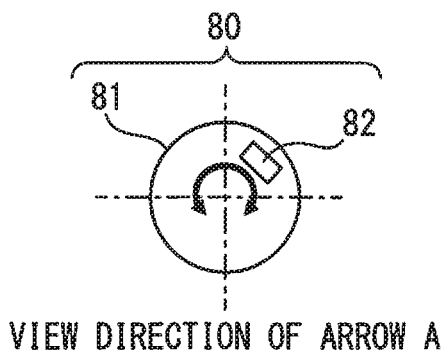
FIG. 16 is a seventh enlarged view of the rotation axis module.
Figure 16:
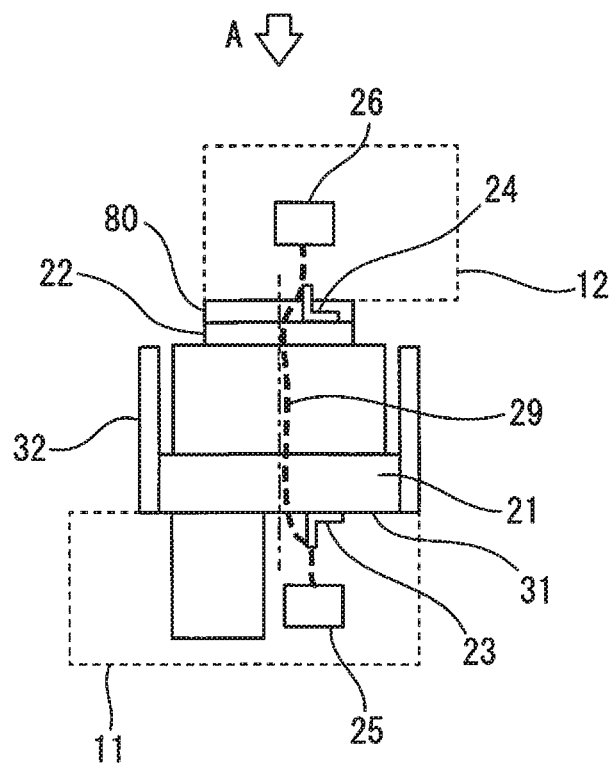

FIG. 16 is a seventh enlarged view of the rotation axis module. In FIG. 16, between the movable member 22 and the second link 12, a twist amount measurement device 80 is inserted, and a twist amount of an output axis of the rotation axis module can be actually grasped in an accurate manner. In the twist amount measurement device, as illustrated in FIG. 16, a semiconductor strain gauge 82 which detects a twist is adhered on a disk member 81. The semiconductor strain gauge may be anything that can measure a displacement amount. For example, those in which a laser displacement gauge, a proximity sensor, or a contact type displacement gauge is built the disk member 81 may be suitable, and a torque measurement device and a force sensor themselves may be also suitable. Thereby, an accurate twist amount of the output axis of the rotation axis module or an accurate torque applied to the output axis can be grasped so that by combination with position information and torque information of the drive motor, and the like, a sensitive servo feedback control can be performed. For example, an advantage is exhibited for an immediate stop even when a slight force is applied, a function of operation in which a robot user directly manually moves the links and a tool portion of the robot (leadthrough), and the like. The twist amount measurement device, the torque measurement device, or the force sensor may be mounted to the fixed member 21, and in such a case, a difference of measurement values between the fixed member side and the movable member side can be considered and used for a servo feedback control, and the like.

Effects of the Invention

In the first and twenty-first aspects of the invention, the umbilical member is fixed to the fixed member and the movable member, while both the end portions of the umbilical member are connected to the relay portions, for example, connectors. Thus, the rotation axis module in which the umbilical member is finished only with a twisting movement can be provided. When it is necessary to urgently change a layout of the robot including the rotation axis module, the relay portions are detached and reconnected, thereby being capable of easily rearranging the robot. Further, with respect to arrangement of the robot using the rotation axis module, robot manufacturing makers can perform automatic arrangement using the robot and the like. In current robot manufacturing, performing an operation of passing a cable into a hole in an arm by a robot is not technically easy. In the rotation axis module, it is unnecessary to perform a disposition of a movable portion, and merely relay connectors are made to be fitted so that a robot assemblage system using the rotation axis module 10 which allows the relay connectors to be fitted by using a vision, such as a visual sensor, and the robot can be constructed. Further, replacement of connectors is easy so that the number of control axes and an axis configuration of the robot can be freely changed by a robot user. Note that the umbilical member is configured to include at least one of a power wire and a signal wire for the actuator 20, a power wire, a signal wire, and an air pipe for controlling a tool.

In addition, the umbilical member is allowed to pass around a rotation axis of the rotation axis module, and the umbilical member is fixed to the movable member and the fixed member of the rotation axis module so that stresses applied to the umbilical member become only a twisting movement, stresses to the umbilical member can be reduced, and the lifetime can be expected to be longer.

Further, a disposition of the umbilical member is finished in the rotation axis module so that in replacing the rotation axis module, a replacement operation becomes easy.

In the second aspect of the invention, the umbilical member includes the wireless transmission unit, and the boundary portion between the movable member and the fixed member is disposed in such a manner as to correspond to the boundary portion between the transmission side member and the reception side member of the wireless transmission unit so that even when the joint portion is used for a long period, the lifetime fails to decrease due to deterioration of the area of the wireless transmission unit. It is why because abrasion due to sliding movements between components and the like fails to occur. Further, in the area of the wireless transmission unit, it is unnecessary to take care such that the umbilical member does not intersect with each other.

In the third aspect of the invention, the rotary joint can transmit electricity and air while rotating so that a twisting disposition of the umbilical member can be easily performed. In addition, in the area of the rotary joint, it is also unnecessary to take care of the umbilical member not to intersect with each other. Further, using the rotary joint enables transmission of air.

In the fourth aspect of the invention, the umbilical member can be fixed around the center of the rotation axis so that the rotation axis module can be made to be compact.

In the fifth aspect of the invention, air can be supplied using the air supply tube which passes through the hollow portion of the wireless transmission unit. When the rotation axis module is a part of a robot, air can be supplied to a tool of the robot by the air supply tube. By the fifth aspect of the invention, stresses applied to the air tube become only a twisting movement so that the lifetime of the air tube can be extended.

In the sixth aspect of the invention, air can be supplied using the air supply tube which passes outside the wireless transmission unit. When the rotation axis module is a part of a robot, air can be supplied to a tool of the robot by the air supply tube. By the sixth invention, it becomes unnecessary for the wireless transmission unit itself to have a hollow structure so that the wireless transmission unit can be made to be compact and costs can be reduced.

In the seventh aspect of the invention, the drive motor can be made to be smaller so that the compact rotation axis module can be provided and an electricity use amount can be reduced. Further, the drive motor may house a brake.

In the eighth aspect of the invention, the direct drive motor is used so that the links can be directly driven without using the speed reducer, and a position determination accuracy of the robot can be improved. Further, since the speed reducer is not provided, arrangement becomes comparatively easy.

In the ninth aspect of the invention, a reverse efficiency of the speed reducer can be intentionally improved so that an external force applied to the links come to be easily transmitted to the motor itself. When the robot comes into contact with a person and a peripheral device, by using a servo feedback control, the robot can be immediately stopped without using a contact sensor. In addition, an operation in which a robot user directly moves the links and a tool portion of the robot (leadthrough), and the like becomes easy. Such a matter is particularly advantageous when a person and the robot cooperatively operate.

In the tenth aspect of the invention, the link length and the link offset amount can be easily changed so that the degree of freedom of application of the robot for a robot user can be improved.

In the eleventh aspect of the invention, the axis configuration of the robot can be easily changed, and the degree of freedom of application of the robot for a robot user can be further improved. In addition, the number of axes can be also freely increased by increasing the same rotation axis module and the links.

In the twelfth aspect of the invention, the relay umbilical member itself can be simplified so that a work efficiency of rebuilding the robot can be improved and costs can be reduced. Further, in assemblage of the links, it is only necessary to connect the rotation axis module and the links and allow the relay portions to be fitted so that an arrangement operation becomes easy.

In the thirteenth aspect of the invention, a minimum configuration allows arrangement of the relay umbilical member and the like to be changed, the number of circuits of the relay umbilical member can be minimum, and costs of the relay umbilical member can be further reduced. In addition, in accordance with positions of the axes of the robot, necessary circuits can be easily changed, and rearrangement becomes easy.

In the fourteenth aspect of the invention, while the links are not attached, calibration of the axis origin position of the rotation axis module can be performed, and calibration of the origin position of the robot which has hitherto necessitated to be performed normally by moving all the axes of the robot can be performed for one axis in an independent manner with respect to each axis so that calibration can be comparatively easily performed. Further, if replacement by the rotation axis module in which calibration has been completed in advance is performed, even calibration becomes unnecessary and a rearrangement operation of the robot becomes easy.

In the fifteenth aspect of the invention, while the links are attached, calibration of the axis origin position of the rotation axis module can be performed, and calibration of the origin position of the robot as a finished robot can be comparatively easily performed in comparison with calibration which has hitherto necessitated to be performed normally by moving all the axes of the robot.

In the sixteenth aspect of the invention, the cover is attached to the rotation axis module and a part of the links so that an impact can be softened. Such a matter is particularly advantageous when a person and the robot cooperatively operate.

In the seventeenth aspect of the invention, a seal structure at the link side becomes unnecessary so that a work efficiency in rearrangement of the robot can be improved.

In the eighteenth aspect of the invention, replacement of only the umbilical member in the rotation axis module is enabled, and maintenance costs can be reduced.

In the nineteenth aspect of the invention, another umbilical member, such as a cable for driving a tool and an air tube, can be added afterwards, which is thus advantageous. Further, when the number of axes of the robot is increased, an actuator drive umbilical member can be easily additionally provided.

In the twentieth aspect of the invention, an accurate twist amount of the output axis of the rotation axis module or an accurate torque applied to the output axis can be grasped so that by combination with and torque information of the drive motor, and the like, a sensitive servo feedback control can be performed. For example, an advantage is exhibited for an immediate stop even when a slight force is applied, an operation in which a robot user directly moves the links and a tool portion of the robot (leadthrough), and the like. Typical embodiments have been used to describe the present invention, but it will be understood that a person skilled in the art could make the above-mentioned changes and various other changes, deletions, and additions without departing from the scope of the present invention.

The invention claimed is:

1. A rotation axis module, comprising:
an actuator configured as a speed reducer and a drive motor, or configured as a direct drive motor;
an umbilical member which penetrates and extends through the interior of the actuator along only a central axis of the actuator;
a first relay portion which is positioned on one end side of the actuator and to which one end of the umbilical member is connected;
a second relay portion which is positioned on the other end side of the actuator and to which the other end of the umbilical member is connected; and
a first fixing portion and a second fixing portion which secure the umbilical member to the actuator between the first relay portion and the second relay portion.

2. The rotation axis module according to claim 1, wherein the actuator comprises a fixed member to which a first link is to be mounted, and a movable member which is rotatable relative to the fixed member and to which a second link is to be mounted.

3. The rotation axis module according to claim 2, wherein in the interior of the actuator, the umbilical member transmits electricity in a space of a boundary portion between the movable member and the fixed member in a wireless manner using a wireless transmission unit which transmits electricity.

4. The rotation axis module according to claim 3, wherein the wireless transmission unit has a hollow structure, and an air supply tube which extends along a rotation axis of the movable member passes through the wireless transmission unit.

5. The rotation axis module according to claim 3, wherein an air supply tube which extends along a rotation axis of the movable member is disposed outside the wireless transmission unit.

6. The rotation axis module according to claim 2, wherein the first fixing portion is provided at a rotation axis of the fixed member or in the vicinity thereof, and the second fixing portion is provided at a rotation axis of the movable member or in the vicinity thereof.

7. The rotation axis module according to claim 2, further comprising a change mechanism portion which changes a link length or an offset amount of at least one of the first link and the second link.

8. The rotation axis module according to claim 2, wherein the actuator comprises a first attachment portion which is arranged perpendicular relative to an output axis of the movable member and is to be mounted to one of the first link and the second link, and a second attachment portion which is arranged parallel relative to the output axis of the movable member and is to be mounted to the other of the first link and the second link, and
the first attachment portion and the second attachment portion have a mounting interface common to a second link mounting surface of the movable member.

9. The rotation axis module according to claim 2, wherein the first link and the second link comprise a relay umbilical member, a third relay portion to which one end of the relay umbilical member is connected, and a fourth relay portion to which the other end of the relay umbilical member is connected,
the third relay portion of the first link is configured to be connected to the first relay portion, and
the fourth relay portion of the second link is configured to be connected to the second relay portion.

10. The rotary axis module according to claim 9, wherein from at least one of the relay umbilical member, the third relay portion, and the fourth relay portion, at least one branch umbilical member is bifurcated, and
the rotary axis module comprises an arrangement change portion which changes arrangement of the relay umbilical member and the at least one branch umbilical member.

11. The rotation axis module according to claim 2, further comprising a definition mechanism portion which defines a correlation between an origin point of an output axis of the movable member and a reference of the fixed member while the first link and the second link fail to be attached to the fixed member and the movable member, respectively.

12. The rotation axis module according to claim 2, further comprising a definition mechanism portion which defines a correlation between an origin point of an output axis of the movable member and a reference of the fixed member while the first link and the second link are attached to the fixed member and the movable member, respectively.

13. The rotation axis module according to claim 2, wherein at least one of a twist amount measurement device, a torque measurement device, and a force sensor is mounted on or incorporated into at least one of the movable member and the fixed member.

14. The rotation axis module according to claim 1, wherein in the interior of the actuator, the umbilical member is provided with a rotary joint which transmits electricity and air.

15. The rotation axis module according to claim 1, wherein the actuator is a combination of a speed reducer and a drive motor.

16. The rotation axis module according to claim 15, wherein the speed reducer comprises a plurality of parallel axes or intersecting axes, a plurality of gears which are mounted on the plurality of parallel axes or intersecting axes, and a plurality of ball bearings which support the plurality of parallel axes or intersecting axes.

17. The rotation axis module according to claim 1, wherein the actuator is a direct drive motor.

18. The rotation axis module according to claim 1, further comprising an attachment member to which a cover for covering the rotation axis module is attached.

19. The rotation axis module according to claim 1, further comprising a seal portion which seals the actuator.

20. The rotation axis module according to claim 1, wherein the umbilical member is configured to be attached to and detached from the rotation axis module.

21. The rotation axis module according to claim 1, wherein another umbilical member which penetrates through the interior of the actuator is added.

22. A robot, comprising at least one rotation axis module according to claim 1.

* * * * *